Dec. 3, 1929.     R. W. BROWN     1,738,491
TIRE INFLATING MACHINE
Filed July 10, 1925     8 Sheets-Sheet 1

INVENTOR.
Roy W. Brown.
BY
ATTORNEY.

Dec. 3, 1929.  R. W. BROWN  1,738,491

TIRE INFLATING MACHINE

Filed July 10, 1925   8 Sheets-Sheet 4

INVENTOR.
Roy W. Brown.
BY
ATTORNEY.

Dec. 3, 1929.　　　　　R. W. BROWN　　　　　1,738,491
TIRE INFLATING MACHINE
Filed July 10, 1925　　　8 Sheets-Sheet 5

INVENTOR.
Roy W. Brown.
BY
ATTORNEY.

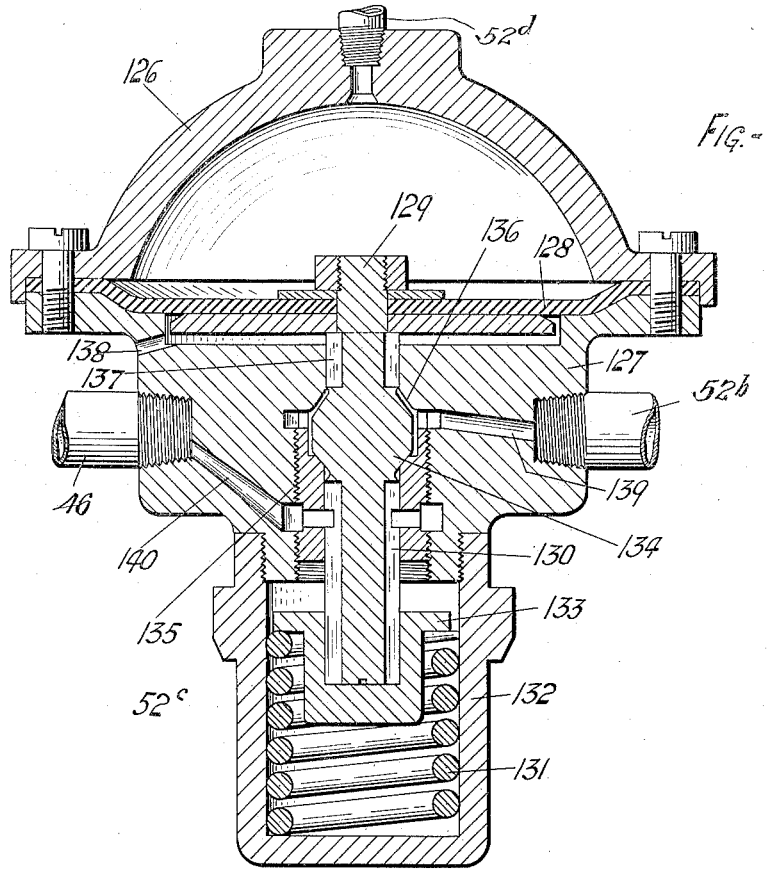
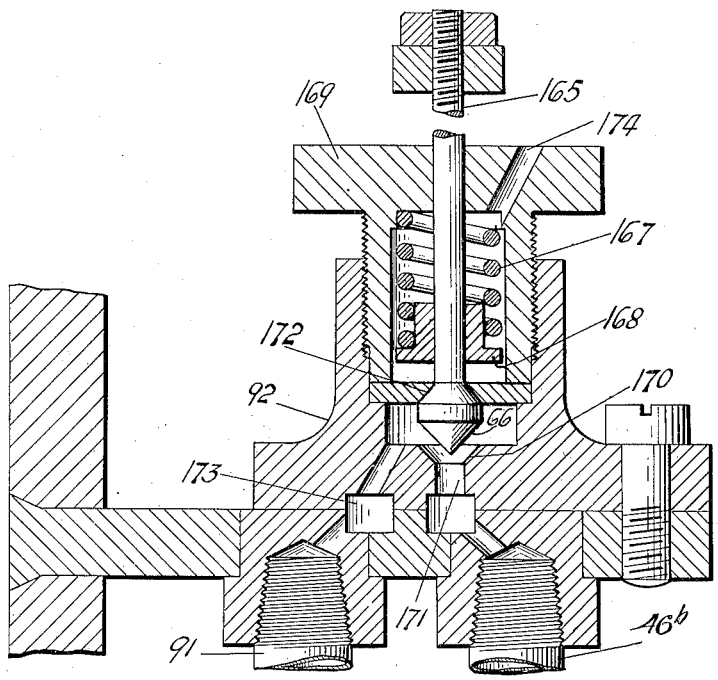

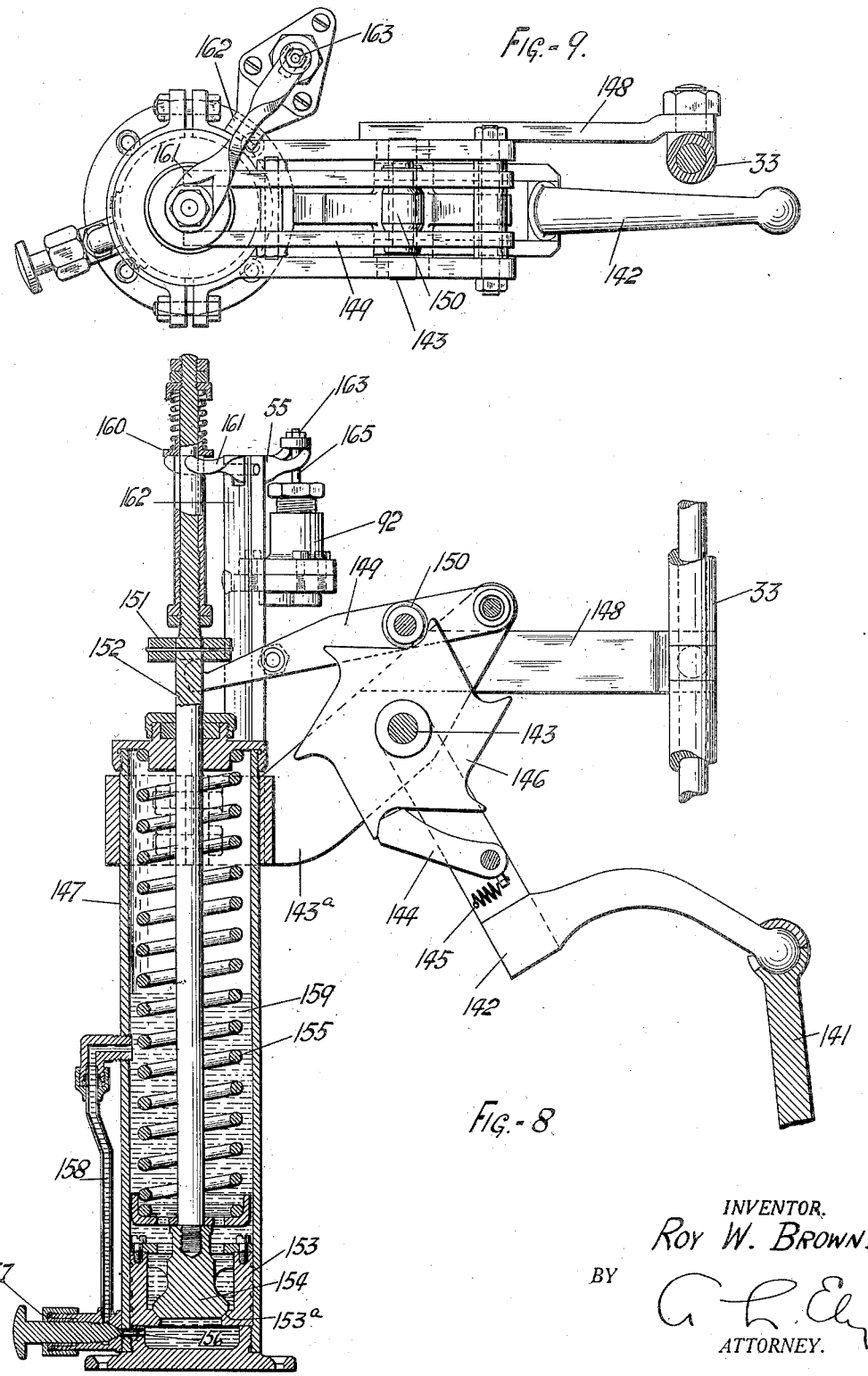

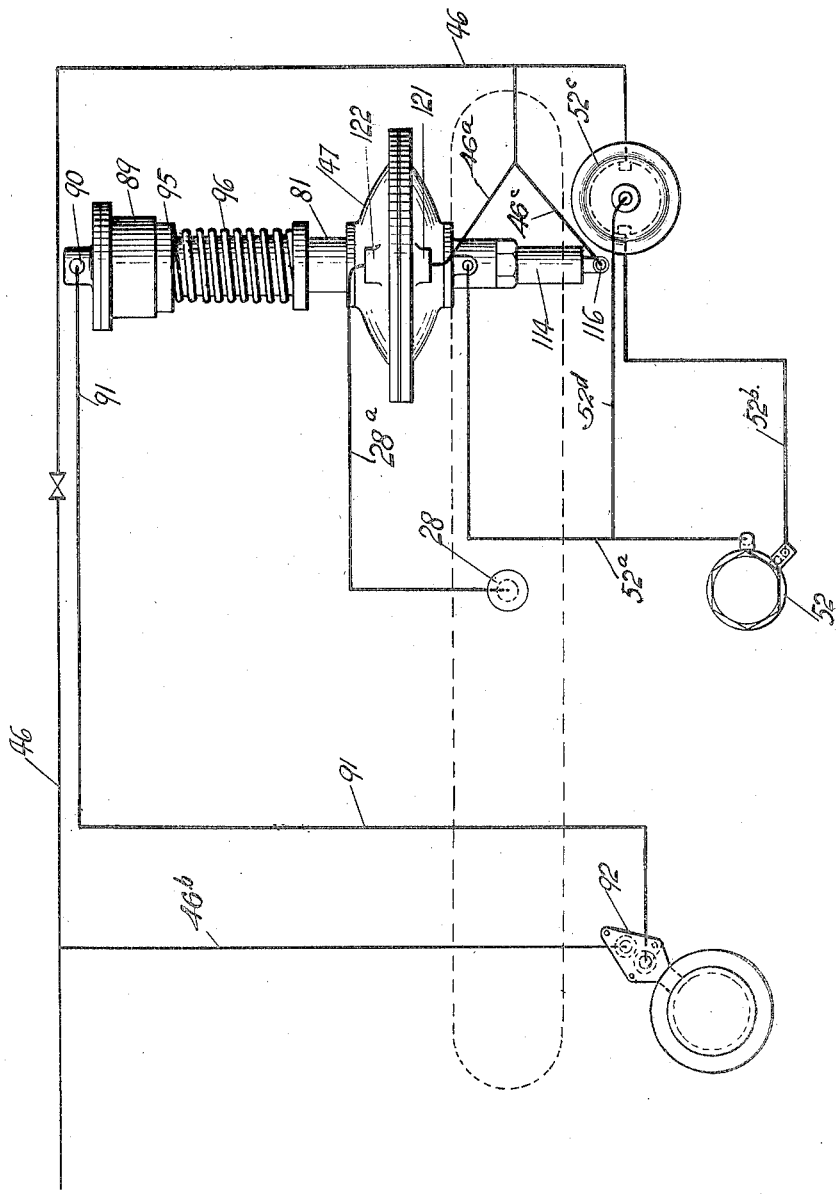

Patented Dec. 3, 1929

1,738,491

UNITED STATES PATENT OFFICE

ROY W. BROWN, OF AKRON, OHIO, ASSIGNOR TO THE FIRESTONE TIRE AND RUBBER COMPANY, OF AKRON, OHIO, A CORPORATION OF OHIO

TIRE-INFLATING MACHINE

Application filed July 10, 1925. Serial No. 42,853.

This invention relates to machines for inflating pneumatic tires on rims, the machine being adapted for use in automobile assembling plants or the like.

The chief object of the invention is to provide a machine for receiving non-inflated tires on their rims in succession and automatically inflating the tires to any desired pressure rapidly and effectively.

Another object is to provide a valve stem receiving chuck adapted to be moved into engagement with the valve stem of the tire and to place the interior thereof in communication with the source of air pressure.

Another object is to provide means for securing uniform inflation pressures in the tires from a source of air supply in which the air pressure may be more or less variable.

Another object is to provide means for adjusting the device to obtain determinate inflation pressures.

Another object is to provide means for automatically securing a tire positively in position in the machine while it is being inflated.

Another object is to provide means for timing the inflating operation adapted to maintain the tire directly connected to the source of supply during the inflating operation but to automatically disconnect the tire from the direct source of supply just prior to the desired inflation pressure being reached in the tire.

Another object is to provide means for releasing the securing means automatically at the end of the inflating operation.

Another object is to provide means for automatically ejecting the tire out of the machine at the completion of the inflating operation.

The foregoing and ancillary objects are obtained by the construction illustrated in the accompanying drawings and described in detail below. It is to be understood that the invention is not limited to the specific construction shown and described.

Of the accompanying drawings:

Figure 6 is a detail vertical diametral section through the cylinder controlling valve;

Figure 7 is a detail vertical diametral section through the dashpot controlled or reset valve;

Figure 8 is a detail elevation, partly in section, of the dashpot and mechanism for operating the same;

Figure 9 is a plan thereof; and

Figure 10 is a diagrammatic plan showing the piping for the air pressure system of the device.

The supporting structure

Figure 1:
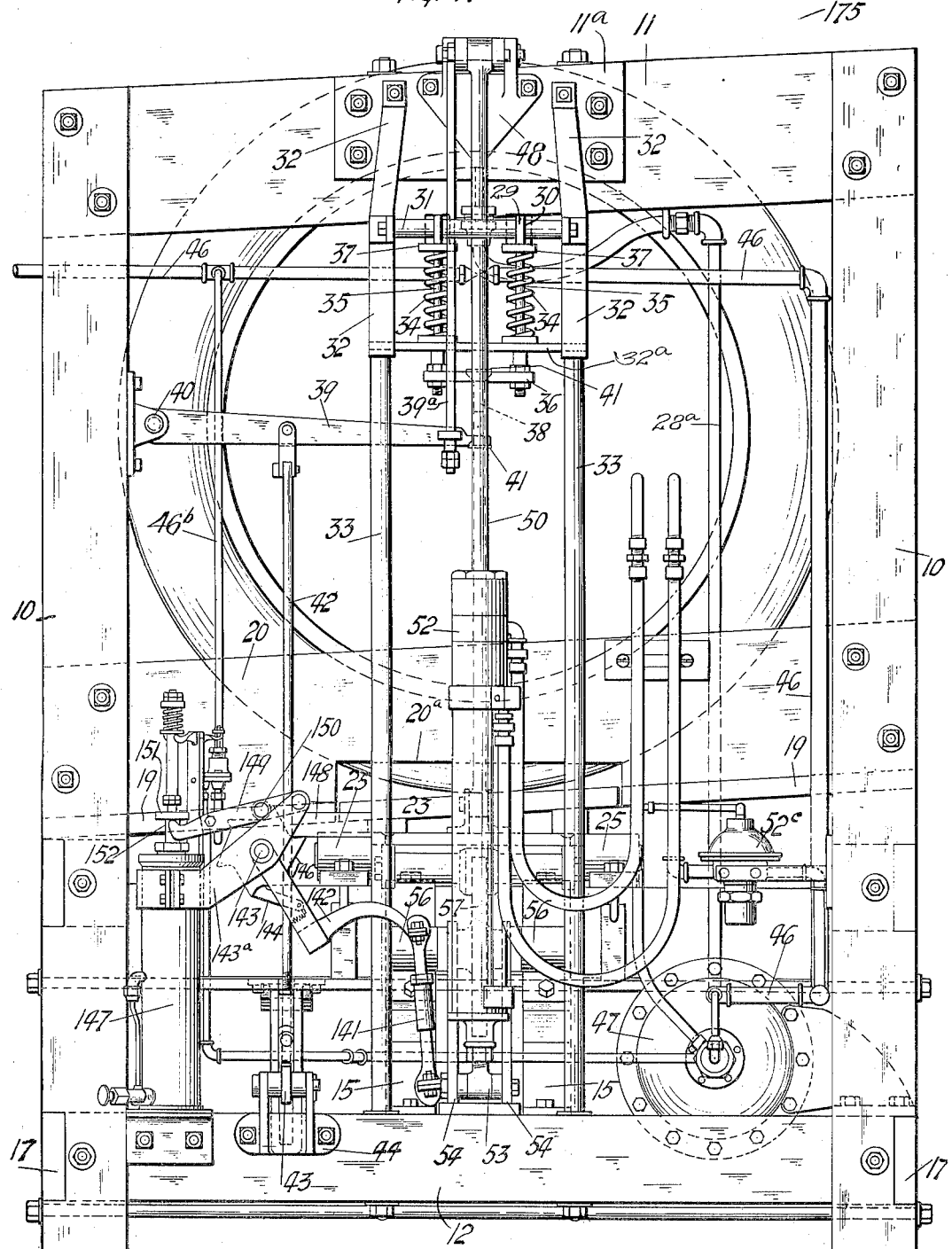
Figure 1 is a rear elevation of a device embodying the invention.
Figure 2:
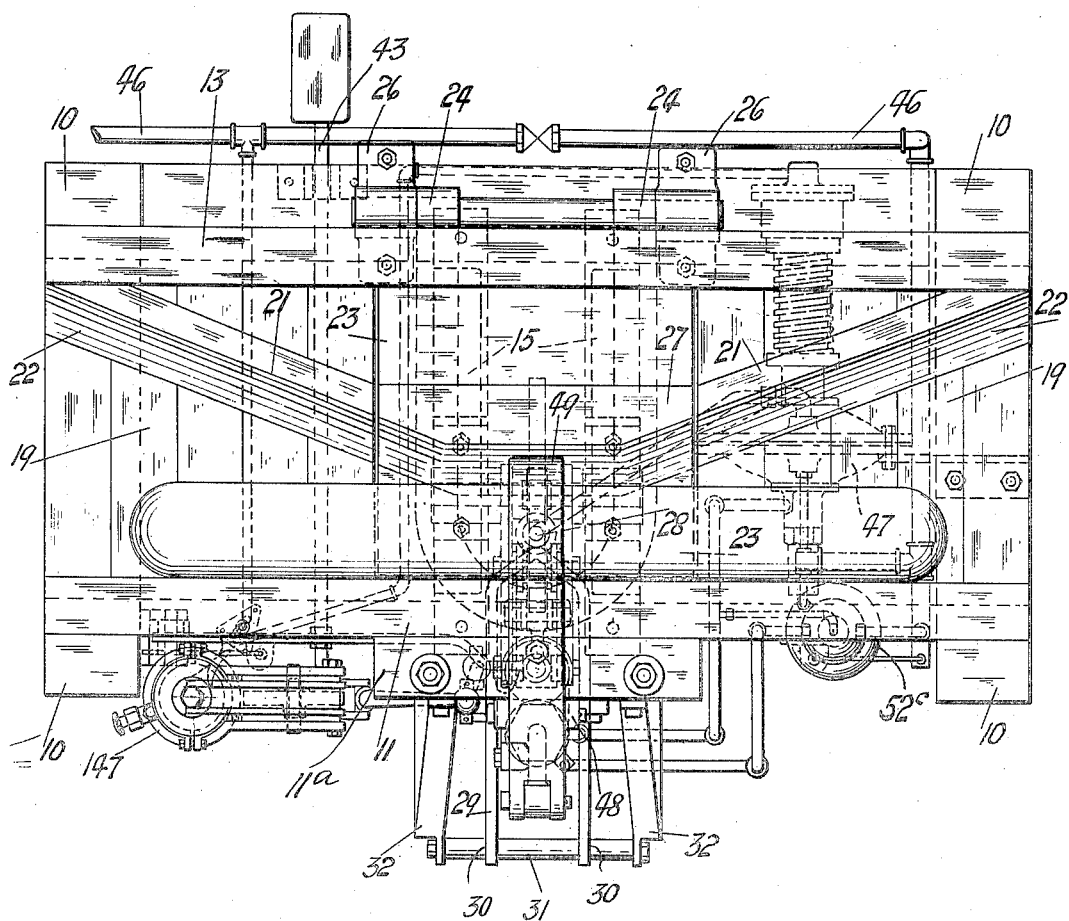
Figure 2 is a plan thereof.

This structure includes four posts 10, 10 connected at the rear by upper and lower beams 11 and 12 and at the front by upper and lower beams 13 and 14. The posts 10 are connected and supported by braces indicated at 15 and by cross-pieces indicated at 17. Elevated from the bottom of the structure is a floor 19 secured on the under sides of beams 20, 20, the beams 20 being so arranged that the floor 19 will slope from the left to the right through the device whereby the tires will roll by gravity therefrom when released. To guide a tire into position in the device, a guide rail 21 is arranged on the floor 19, the rail 21 having a sloping side 22 and extending inwardly over the floor 19 from the left front end of the machine to adjacent the rear of the machine at the tire-inflating station and then outwardly thereof toward the right front end of the machine.

There is provided in floor 19 a trap 23 arranged to be elevated by mechanism, later to be described, to lift the tire from engagement with the air pressure supply chuck carried by the machine, the trap being carried by a U-shaped support 24 pivoted at 25, 25 on brackets 26, 26 secured on beam 14. The rail 21 over trap 23 is formed by a separate rail block 27 mounted on the trap. Beams 20 are notched as at 20ª to clear the trap 23.

The air supply chuck and operating mechanism therefor

Figure 3:
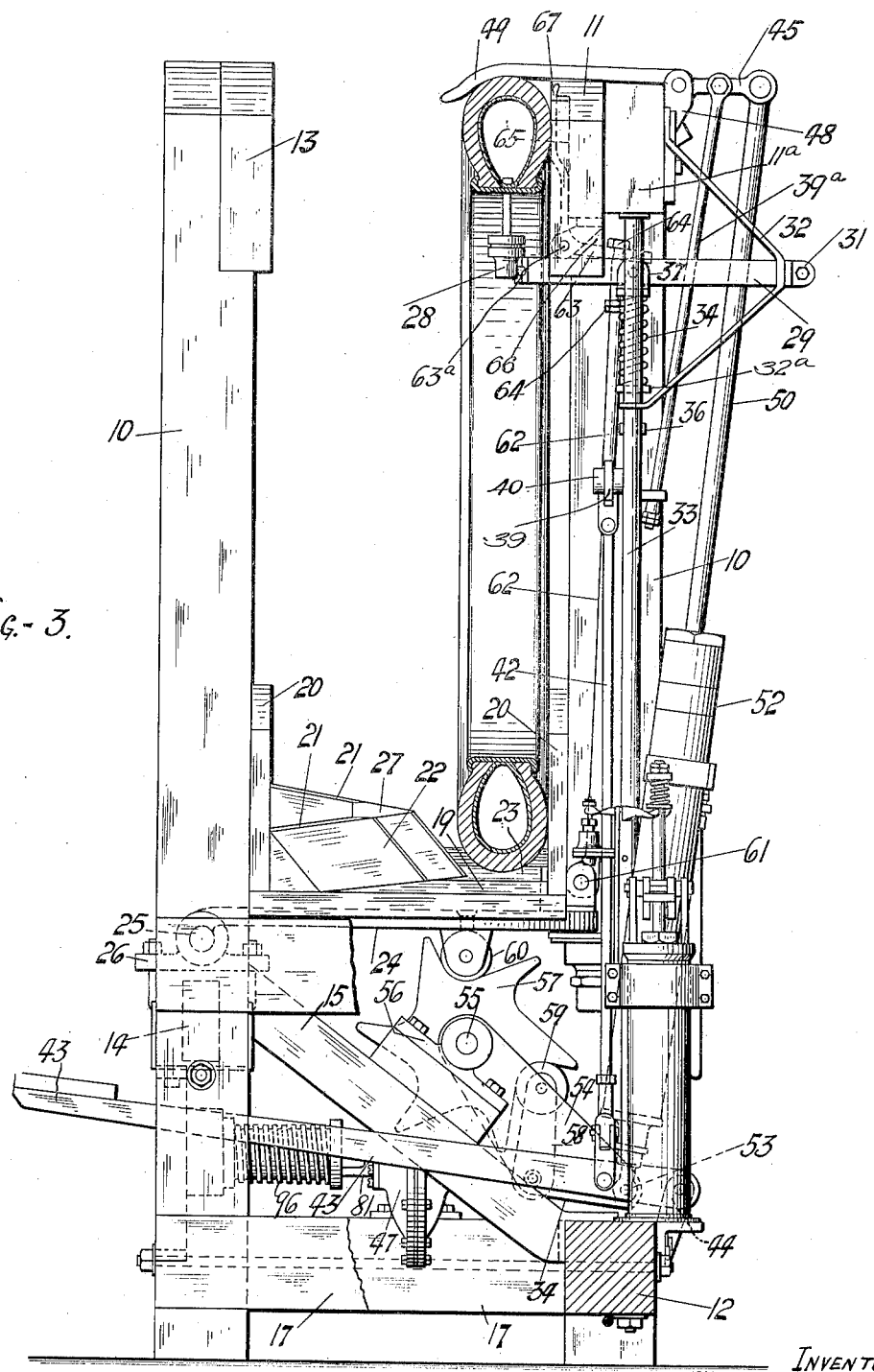
Figure 3 is a right end elevation thereof, part of the supporting structure being broken away.

The numeral 28 indicates a valved air supply chuck such as have in the past been employed on air supply hoses for inflating tires. The chuck 28 is mounted on a U-shaped arm 29 pivoted at 30, 30 on a rod 31 secured on, and extending between, a pair of brackets 32, 32 which are secured at one end on uprights 33 mounted on beam 12, the other end being secured to beam 11 through the spacing block 11ª. Arm 29 is normally held in the position shown in Figure 3 by compression springs 34, 34 encircling rods 35, 35 slidably extending through a cross piece 32ª on brackets 32 and connected to a crosshead 36. The upper ends of rods 35 have enlarged heads 37, 37 against which springs 34 abut and are pivotally connected to arm 29. To depress chuck 28 for mounting a tire in place in the machine, there is connected to crosshead 36 by a link 38, an arm 39 pivoted at 40 on post 10. The link 38 is slidable in apertures in crosshead 36 and arm 39, but is formed with enlarged heads 41, 41 on its ends whereby movement of arm 39 downwardly will pull crosshead 36 downwardly against the action of springs 34 resulting in depression of chuck 28. Arm 39 has connected thereto a link 42 which connects arm 39 with a pedal lever 43 pivoted on a bracket 44. Means are provided to positively force the pedal lever upwardly when the tire is clamped in the machine. These means include a link 39ª connecting arm 39 with clamp operating lever 45 next to be described. Air is supplied to chuck 28 from a supply line 46 through a flow controller 47 to be later described, and a conduit 28ª connecting the controller 47 and chuck 28.

Tire clamp and trap operating mechanism

Figure 5:
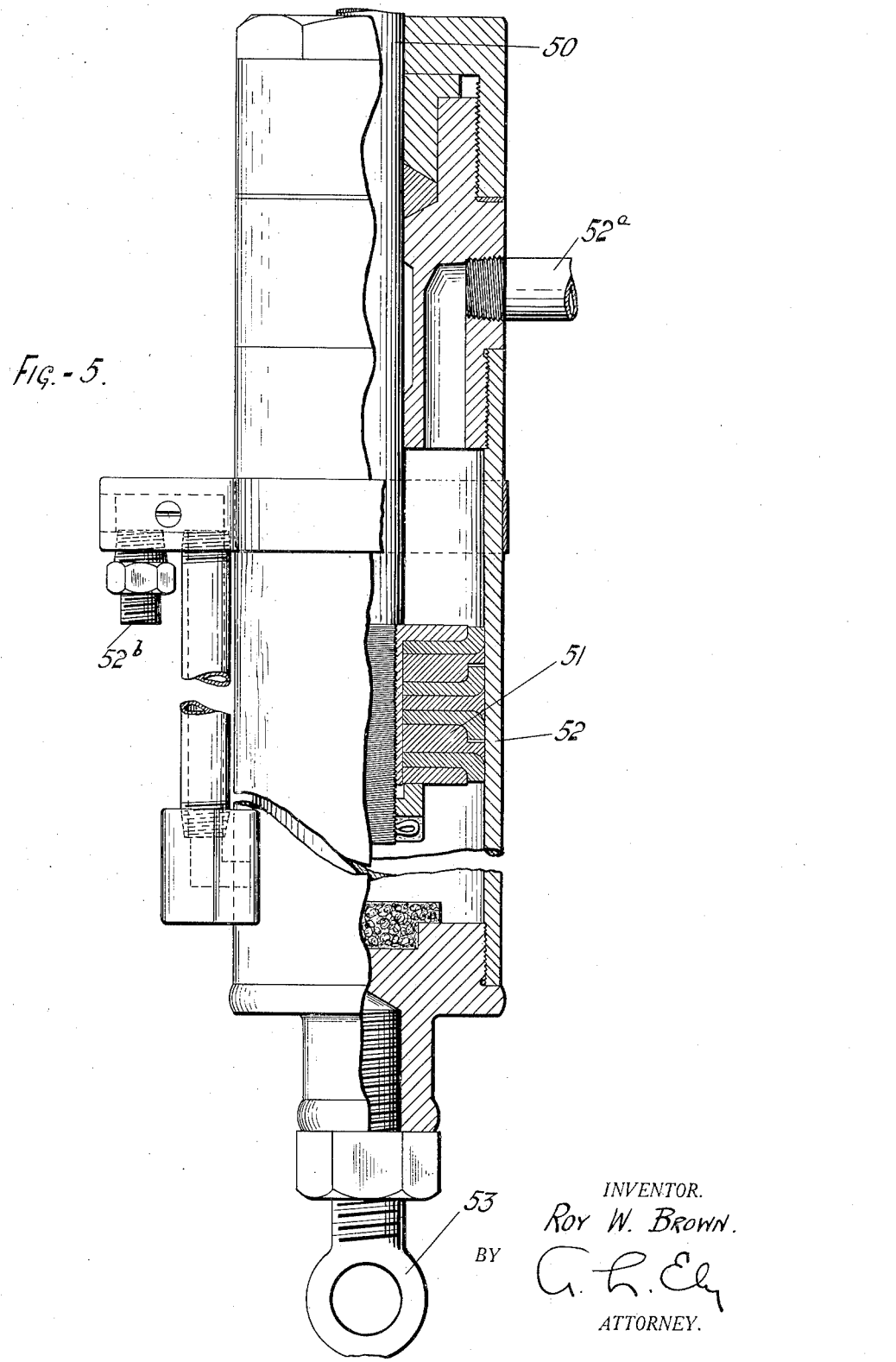
Figure 5 is a detail elevation, partly in section, of the tire clamp and dashpot operating cylinder.

The tire-clamping mechanism includes the lever 45 pivoted on a bracket 48 on spacing block 11ª and formed with a portion 49 adapted to engage over the outer periphery of the tire and urge it downwardly toward chuck 28. The clamp lever 45 is adapted to be automatically operated to clamp the tire by exhaust of air pressure when the valve of chuck 28 is opened and air is supplied through said chuck to the tire and also to be automatically operated to be disengaged from the tire when the desired inflation thereof is obtained. The trap 23 is also arranged to be elevated as the clamp is disengaged from the tire to lift the tire off the chuck 28. To these ends, the lever 45 has connected thereto a rod 50 having a double acting piston 51 thereon (Figure 5) reciprocable in a cylinder 52 which is connected by an eye 53 to a lever 54 journaled on a spindle 55 mounted in bearings 56, 56 arranged on two central braces 15. Spindle 55 has a star cam wheel 57 journaled thereon, and lever 54 carries a second lever 58 having a roller 59 journaled on its free end arranged to engage star wheel 57 to rotate the same as lever 54 is swung upwardly but to be ineffective to rotate the star wheel when lever 54 is swung downwardly. On the bottom of trap 23 at a point more or less remote from pivots 25 is journaled a roller 60 riding on the periphery of star wheel 57. A supply of air to the upper end of cylinder 52 is obtained by means of a conduit 52ª leading from flow controller 47 and to the lower end thereof by a conduit 52ᵇ leading from supply line 46 through a control valve 52ᶜ (Figure 6).

The tire ejecting mechanism

The trap 23 has connected thereto at 61 a link 62 slidable at its upper end through an arm 63 and formed with spaced stops 64, 64 thereon for engaging said arm just prior to the limit of movement of the link 62 upwardly or downwardly to swing said arm upwardly or downwardly. Arm 63 is pivoted at 63ª in a notch or groove 65 in beam 11 and extends through an aperture 66 in said beam. An ejector 67 arranged to engage the side of a tire normally lies in groove 65 and is connected to arm 63 to be actuated out of and returned into said groove thereby, these actions taking place in the order named upon elevation and lowering of the trap 23 by star wheel 57.

The flow controller

Figure 4:
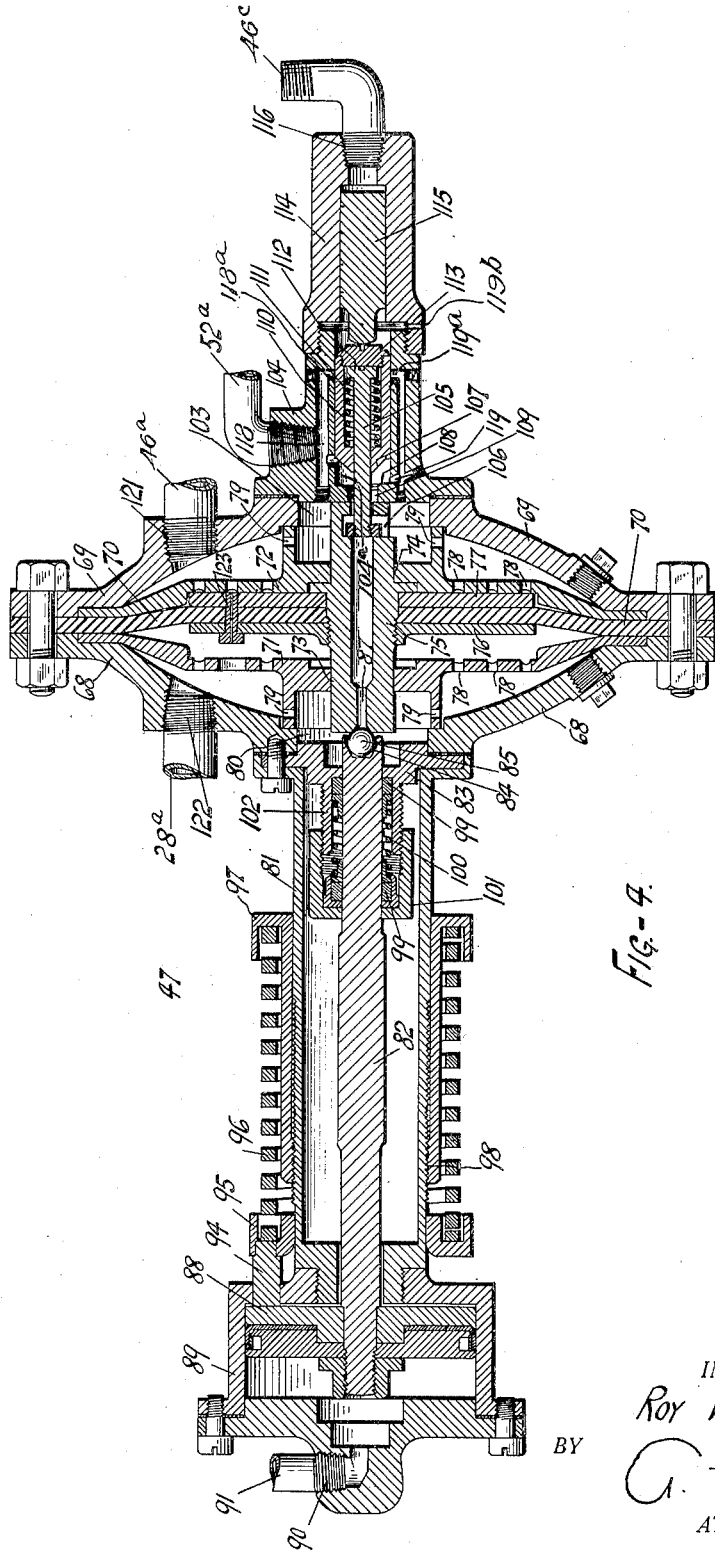
Figure 4 is a detail diametral section through a flow controller forming part of the device.

The flow controller 47 is best shown in Figure 4. It consists of a two part casing including concave disks 68 and 69 having a flexible diaphragm 70 clamped therebetween and forming an air-tight chamber divided into separate compartments by said diaphragm. There are also arranged between the disks 68 and 69, rigid disks 71 and 72 formed with central bearings 73 and 74 in which is slidably mounted a valve body 75 extending through diaphragm 70 and clamped thereon by rigid disks 76 and 77. Disks 71 and 72 are perforated as at 78, 78 and 79, 79 so that in cooperation they merely form a cage in which diaphragm 70 is shiftable and on which valve body 75 is slidable.

Disk 68 is formed with a central opening 80 onto which is secured a casing 81. In casing 81 is reciprocably mounted a valve stem 82, slidable in a bearing disk 83 secured between disk 68 and casing 81, and having a socket 84 in its end projecting into the left controller compartment and having a ball 85 seated in said socket. The ball 85 is adapted to cooperate with a seat formed on the left end of valve body 75 at the end of a duct 87 formed through said valve body, the duct 87 being provided to place the right controller compartment in communication with the left compartment when valve 85 is open. Valve stem 82 is operated by a piston 88 in a cylinder 89, air under pressure being admissible on the left side of said piston through an inlet 90 connected by a conduit 91 to reset air valve 92, later to be described, which in turn is connected to supply pipe 46 by conduit 46$^b$. Operable against the right side of said piston 88 are members 94 urged against said piston by a collar 95 which is urged to the left by a compression spring 96, encircling casing 81, and compression in which is adjustable by means of a collar 97 threaded as at 98 onto said casing. The valve stem 82 is packed to prevent leakage from the left controller compartment by means of packing rings 99, 99 expanded and held separated thereon by a spring 100 retained by a housing cap 101 threaded onto a sleeve extension 102 formed on disk 83.

Disk 69 has a central opening 103 therein over which is secured a valve casing 104 in which is reciprocable a valve stem 105 having a lost-motion connection 106 with valve body 75 and carrying thereon a valve 107 arranged to cooperate with a seat 108 about the right end of a duct 109 adapted when the valve is open to place the bore 104$^a$ of valve body 104 in communication with the right controller compartment. In order that stem 105 may move with valve body 75 after valve 107 is seated, the latter is formed with a bore 110 containing a compression spring 111 arranged between the valve 107 and a head 112 formed on stem 105, the bore 110 being closed by a plug 113.

There is provided on the right end of valve body 104 a cylinder 114 having a piston 115 reciprocable therein and tending to urge valve 107 against its seat 108 by provision of a supply of air pressure to the cylinder 114 on the right end of the piston through an inlet 116 connected by a conduit 46$^c$ to the air pressure supply line 46. Valve 107 in effect forms a part of piston 115 against which pressure in the right compartment of the controller will be effective in opposition to the pressure against piston 115. Valve 107 is adapted to control the supply of air pressure to the top of cylinder 52, valve body 104 being provided with a passage 118 connected to conduit 52$^a$ and a duct 118$^a$ communicating with passage 118 for venting said conduit when valve 107 is closed. To carry off any air leaking past valve 107 when closed, very small ducts 119, 119$^a$ are provided through valve body 104 and a vent 119$^b$ provided through cylinder 114 as shown. Ducts 118$^a$ and 119$^a$ are so positioned that the cylindrical portion of valve 107 covers them when valve 107 is open and thus prevents escape of air. When valve 107 is closed, ducts 118$^a$ and 119$^a$ are cleared and vent 119$^b$ permits escape of any leakage through valve seat 108 as well as venting conduit 52$^a$ through passage 118 and duct 118$^a$. Duct 109 formed in valve body 104 serves as an air passage communicating with duct 87 permitting air to flow, when valve 107 is open, from the right compartment of controller 47 through duct 109 into bore 104$^a$ and through passage 118 to conduit 52$^a$ as will be later explained.

Air is supplied to the right flow controller compartment by means of a conduit 46$^a$ connected to an inlet 121 in disk 69. Air is conducted from the left controller compartment through an outlet 122 with which is connected conduit 28$^a$ leading to chuck 28. A very small throttling port 123 is provided through diaphragm 70, this port being arranged in alignment with aligned perforations 78 in disks 71 and 72.

*The cylinder control valve*

The valve 52$^c$ is best shown in Figure 6. This is a diaphragm valve having the usual dome 126 and valve body 127 between which is clamped the diaphragm 128, and spindle 129 connected to the diaphragm 128 and slidable in a bore 130 in the valve body. The spindle 129 is adapted to be urged downwardly by pressure of air on the diaphragm against the action of a compression spring 131 mounted in a housing 132 secured on the lower end of valve body 127, the spring engaging a collar 133 formed on said spindle. A double valve 134 is formed on said spindle and arranged to cooperate with a seat 135 formed on a sleeve threadedly received in bore 130 and a seat 136 about the lower end of a bore 137 communicating with the atmosphere by means of a duct 138 through the valve body. A duct 139 connects bore 130 or bore 137 with conduit 52$^b$, depending on the position of valve 134. A duct 140 connects bore 130 with the air supply 46. Air pressure is supplied to dome 126 by means of a conduit 52$^d$ connected through conduit 52$^a$ to the upper end of cylinder 52 and through valve casing 104 to the right compartment of the flow controller.

*Timing dashpot*

Connected to the lower end of cylinder 52 is an adjustable link 141 (see Figure 8) which connects said cylinder to a lever 142 pivoted at 143 on a bracket 143$^a$ and having pivoted thereon a pawl 144 held by a spring 145 in engagement with a star cam wheel 146 journaled on pivot 143. Bracket 143$^a$ is mounted on a dashpot 147 later to be described and is braced by an arm 148 connected to one upright 33. Pivoted on bracket 143$^a$ is a cam lever 149 having a cam follower 150 thereon riding on star wheel 146.

Lever 149 engages under a collar 151 on a rod 152 having a piston 153 thereon. Piston 153 is formed with an outlet 153$^a$ therein and is relatively slidable on rod 152. Piston 153 is slidable to a limited extent on a valve 154 carried by rod 152 whereby the piston which is provided with the outlet 153ª will cooperate with valve 154 to close the outlet 153ª on the down stroke but to permit it to open on the up stroke. A spring 155 is arranged in dashpot 147 so as normally to urge the piston downwardly therein against the resistance of the fluid in the dashpot. At the bottom of dashpot 147 below the lower limit of the movement of piston 153 is an orifice 156 adjustable by means of a valve 157 for placing the lower end of said dashpot in communication with a by-pass conduit 158 connected to the interior of the dashpot 147 above the upper limit of movement of piston 153 due to the action of lever 149. A fluid indicated at 159 is supplied to the dashpot, flow of which takes place through the piston 153 on the up stroke and which takes place through orifice 156 and conduit 158 on the down stroke, timing of said stroke being accomplished by operation of valve 157 to retard or accelerate the flow.

Adjustably and yieldably mounted on the upper end of rod 152 is a collar 160 arranged to engage a lever 161 on the down stroke of piston 153 to operate the same. Lever 161 is pivoted on an upright 162 mounted on dashpot casing 147 and is arranged to engage a collar 163 on a valve stem 165 for operating reset air valve 92.

The reset air valve

This valve structure is shown in detail in Figure 7, and includes a double-acting valve 166 carried by stem 165, valve 166 being normally held closed by a spring 167 engaging a collar 168 secured on stem 165. The stem spring and collar are carried by a plug 169 threaded into valve body 92 and the spring urges valve 166 against a seat 170 formed about the upper end of a duct 171 which extends downwardly through the valve 92 and is connected to the conduit 46ᵇ. Plug 169 is formed with a vent valve opening at 172 with which valve 166 cooperates, the outlet 172 being adapted to place the duct 173 through the valve body 92, which duct is connected to conduit 91, in communication with a venting outlet 174 in plug 169. When dashpot piston 153 is down, valve stem 165 is raised by lever 161 to close outlet 172 and place conduit 91 in communication with conduit 46ᵇ, as shown in Figure 7.

The operation

In the operation of the device, the tire to be inflated is rolled onto floor 19 and trap 23. The chuck 28 is depressed by depressing pedal 43. The valve stem of the tire is arranged vertically over the chuck and pedal 43 is released whereby springs 34 urge the chuck 28 into engagement with the stem of the tire, placing the interior thereof in communication with conduit 28ª. Air pressures on opposite sides of diaphragm 70 of controller 47 are normally in equilibrium, but connection of the line 28ª to the non-inflated tire causes the pressure on the left of diaphragm 70 to drop which accordingly causes the diaphragm 70 to shift to the left in opposition to the thrust of piston 88.

Shifting of diaphragm 70 to the left closes valve 107 thereby simultaneously cutting off the supply of air pressure to the top of cylinder 52 venting the same through conduit 52ª and vent 119ᵇ and cutting off the supply of air pressure to the dome 126 of valve 52ᶜ, which is also vented through conduit 52ª. This opens valve 135 in the valve structure 52ᶜ and connects the pressure line 46 through conduit 52ᵇ to the bottom of cylinder 52. Supply of air to the bottom of cylinder 52 causes the piston 51 to move upwardly and the cylinder 52 to move downwardly.

Upward movement of piston 51 through rod 50 operates clamp 49 onto the tire (Figure 3) and through link 39ª lever 39 and link 42 elevates pedal lever 43. Downward movement of cylinder 52 swings lever 54 downwardly carrying roller 59 on lever 58 under a tooth on wheel 57 (see Figure 3). Downward movement of cylinder 52 also operates link 141 to swing lever 142 downwardly thus causing star wheel 146 to rotate clockwise and elevates lever 149 through follower 150 and then permits the lever to fall back to the position in Figure 8. Lever 149 rapidly elevates piston 153 through the liquid in dashpot 147 since valve 153ª will be open. This releases lever 161 and permits spring 167 in valve 92 to close valve 170 which accordingly cuts off supply of air under pressure to line 91 and simultaneously vents said line to the atmosphere.

Venting line 91 to the atmosphere relieves pressure on the left of piston 88 in cylinder 89 of the flow controller and permits spring 96 to move piston 88 to the left. This movement is greater than that of valve body 75 due to movement of the diaphragm to the left and consequently effects an opening of valve 85. Accordingly, air under line pressure is supplied from conduit 46ª to the right compartment of the controller 47 and from thence through duct 87 to the left compartment and to conduit 28ª to the tire.

It will appear from the foregoing that full supply of air at the supply line pressure will be maintained at chuck 28 effecting rapid inflation. During the inflation of the tire, the spring 155 in the dashpot 147 is in the meantime causing piston 153 to descend therein. The descent of the piston is, however, resisted by the liquid in the dash pot because valve 153ª will be closed. The amount this movement will be resisted is determinately governed by adjustment of the orifice 156 through which the liquid must flow from below to above the piston. Valve 157 is adjusted to time the inflating operation so that when the inflation pressure of the tire is approximately up to the desired point, rod 152 will have moved downwardly sufficiently to move stem 165 of valve 92 to open valve 170 and close outlet 172 to connect line 46$^b$ to line 91 and accordingly admit air pressure to the cylinder 89 on the left of piston 88. This will close valve 85 with a force the resultant of the pressure of the air in the supply line less the compressive force of spring 96 which, as has been described, is adjustable whereby the inflation pressure desired can be accurately obtained.

Movement of spindle 82 to the right and movement of diaphragm 70 to the right will now take place gradually and the flow of air from the right compartment to the left compartment of controller 47 will be through throttle valve 123 which will bring the left compartment and accordingly the tire up to a pressure determined by the balance of pressures arrived at on either side of the diaphragm 70 and the piston 88. This phase continues until the shifting of piston 88 to the right takes up the lost motion between valve body 75 and valve stem 105 and overcomes the comparatively slight action of piston 115 whereupon valve 107 will be opened, as illustrated in Figure 4.

Opening of valve 107 will supply line pressure through conduit 52$^a$ to the upper end of cylinder 52 and also to the dome 126 of valve 52$^c$. This will disconnect line 46 with line 52$^b$ and will relieve the pressure on the lower end of cylinder 52. All of the figures of the drawings show the parts of the apparatus at this stage of the operation when the tire has been fully inflated and is about to be ejected. Piston 51 will now move downwardly and cylinder 52 upwardly. Movement of piston 51 downwardly operates clamp 49 upwardly by downward movement of rod 50 connected to lever 45.

Movement of cylinder 52 upwardly simultaneously operates trap 23 upwardly by swinging lever 54 upwardly, thus rotating cam wheel 57 through lever 58 and causing follower 60 to ride up on a tooth of said wheel and then to drop in back of said tooth. This throws the tire upwardly off of chuck 28. Movement of the trap upwardly also effects operation of the ejector 67 out of groove 65 by means of link 62 operating the lower stop 64 against arm 63, thus forcing the tire over against beam 13 away from chuck 28. Downward movement of the trap 23 carries the ejector 67 back into groove 65 as will be understood. Movement of cylinder 52 upwardly also operates through link 141 to swing lever 142 upwardly to reset pawl 144 ready for the next operation of timing dashpot 147 and valve 92.

The inflation of the tire may now be tested by connecting to any suitable tire pressure gauge (not shown). If the desired pressure is not being obtained, the compression in spring 96 may be adjusted by screwing collar 97 one way or the other on casing 81.

It will appear from the foregoing that a highly effective device has been provided for receiving a tire and holding the tire during inflation and ejecting it after inflation, the device being actuated entirely by changes in air pressure due to connecting the interior of the tire with a pressure system; a device adapted to produce in tires a determinate inflation pressure less than the supply line pressure, and adapted to accurately inflate the tire to the desired pressure regardless of variations in supply line pressure.

Modifications of the invention may be resorted to without departing from the spirit thereof if within the scope of the appended claims.

What is claimed is:

1. In apparatus of the class described, a system for supplying air under pressure, means for connecting a tire to the system, means actuated by flow of air from the system into the tire to directly connect the supply to the tire, and means adapted to operate said last-mentioned means to disconnect the direct supply of air to the tire just prior to completion of the inflation of the tire to the desired amount, said means including a dashpot, and means controlling the time of the operation thereof.

2. In apparatus of the class described, a system for supplying air under pressure, means for connecting a tire to the system, means actuated by flow of air from the system into the tire to directly connect the supply to the tire, and means adapted to operate said last-mentioned means to disconnect the direct supply of air to the tire just prior to completion of the inflation of the tire to the desired amount.

3. In apparatus of the class described, a support for a tire, a chuck for engagement with the stem of a tire on said support to supply air to said tire, said chuck being movable radially of a tire on said support.

4. In apparatus of the class described, a support for a tire, a chuck for engagement with the stem of a tire on said support to supply air to said tire, said chuck being movable toward and from said support.

5. In apparatus of the class described, a support for a tire, a chuck for engagement with the stem of a tire on said support to supply air to said tire, said chuck being movable toward and from said support, and means for depressing said chuck toward said support to facilitate connection of the same to the valve stem.

6. In apparatus of the class described, a support for a tire, a chuck above the support for engagement with the valve stem of the tire to supply air thereto, a clamping device movable onto the tire above said support to secure it in place on the chuck, an ejector movable against a side of the tire on said support, and means for simultaneously releasing the clamping device, relatively moving the support and chuck and operating the ejector to disengage the tire from the chuck.

7. In apparatus of the class described, a flow controller including a casing, a flexible diaphragm dividing the casing into two compartments, a fluid inlet to one compartment and a fluid outlet from the other, a valve body carried by the diaphragm serving to connect the compartments, a valve cooperating with said valve body, and a fluid pressure controlled piston for opening and closing said valve.

8. In apparatus of the class described, a flow controller including a casing, a flexible diaphragm dividing the casing into two compartments, a fluid inlet to one compartment and a fluid outlet from the other, a valve body carried by the diaphragm serving to connect the compartments, a valve cooperating with said valve body, and a fluid pressure controlled piston for opening and closing said valve, said piston being controlled by the pressure in said other compartment.

9. In apparatus of the class described, a flow controller including a casing, a flexible diaphragm dividing the casing into two compartments, a fluid inlet to one compartment and a fluid outlet from the other, a valve body carried by the diaphragm serving to connect the compartments, a valve cooperating with said valve body, and a fluid pressure and spring controlled piston for opening and closing said valve.

10. In apparatus of the class described, a flow controller including a casing, a flexible diaphragm dividing the casing into two compartments, a fluid inlet to one compartment and a fluid outlet from the other, a valve body carried by the diaphragm serving to connect the compartments, a valve cooperating with said valve body, a throttle valve through said diaphragm for normally equalizing the pressure on opposite sides of the diaphragm, and a fluid pressure controlled piston for opening and closing said first valve.

11. In apparatus of the class described, a pressure supply system, means for connecting a tire thereto, means for securing the tire in the system, means for timing the operation of inflating, means for disconnecting the tire from the system, and a single means for controlling the securing means, the timing means and the disconnecting means.

ROY W. BROWN.